United States Patent
De Traglia Amancio Filho et al.

(10) Patent No.: US 7,780,432 B2
(45) Date of Patent: Aug. 24, 2010

(54) METHOD AND DEVICE FOR CONNECTING A PLASTIC WORKPIECE TO A FURTHER WORKPIECE

(75) Inventors: Sergio De Traglia Amancio Filho, Geesthacht (DE); Jorge F. Dos Santos, Avendorf (DE); Matthias Beyer, Reppenstedt (DE)

(73) Assignee: GKSS-Forschungszentrum Geesthacht GmbH, Geesthacht (DE)

( * ) Notice: Subject to any disclaimer, the term of this patent is extended or adjusted under 35 U.S.C. 154(b) by 384 days.

(21) Appl. No.: 11/607,159

(22) Filed: Dec. 1, 2006

(65) Prior Publication Data
US 2007/0124912 A1 Jun. 7, 2007

(30) Foreign Application Priority Data
Dec. 2, 2005 (DE) ........................ 10 2005 057 891

(51) Int. Cl.
B29C 65/34 (2006.01)
B29C 65/60 (2006.01)
B29C 65/64 (2006.01)

(52) U.S. Cl. ........................ 425/517; 425/508; 425/510; 264/248; 264/249; 29/26 A; 29/564.1

(58) Field of Classification Search ................ 425/506, 425/507, 508, 510, 517; 264/248, 249; 29/26 A, 29/564, 564.1, 798
See application file for complete search history.

(56) References Cited

U.S. PATENT DOCUMENTS

| | | | |
|---|---|---|---|
| 56,494 A | 7/1866 | Gordon | |
| 3,579,809 A | 5/1971 | Wolf et al. | |
| 4,633,559 A * | 1/1987 | Loren | 29/243.5 |
| 4,634,565 A | 1/1987 | Irrgang | |
| 4,803,767 A | 2/1989 | Obrecht et al. | |
| 4,831,704 A | 5/1989 | Rapp | |
| 5,051,020 A | 9/1991 | Schleicher | |
| 5,884,386 A | 3/1999 | Blacket et al. | |
| 6,298,533 B1 * | 10/2001 | Nishimura et al. | 29/243.5 |
| 7,465,905 B2 * | 12/2008 | Braun | 219/265 |

FOREIGN PATENT DOCUMENTS

| | | |
|---|---|---|
| DE | 3418275 | 11/1985 |
| DE | 3726392 | 2/1989 |

(Continued)

*Primary Examiner*—Joseph S Del Sole
*Assistant Examiner*—Robert Dye
(74) *Attorney, Agent, or Firm*—Marshall, Gerstein & Borun LLP (57) ABSTRACT

A method of connecting a plastic workpiece to a further workpiece and a device for carrying out the method are shown and described. The object of providing a method with which a positive-locking connection between a plastic workpiece and a further workpiece can be produced in a short time and without considerable outlay in terms of apparatus is achieved by a method comprising the following steps: providing a plastic workpiece and a further workpiece, placing the further workpiece against the plastic workpiece, providing a connecting element on a surface of the plastic workpiece, this surface being opposite the surface against which the further workpiece bears, producing a recess in the further workpiece, this recess being provided on the surface bearing against the plastic workpiece, heating the connecting element, so that the material of the connecting element is plasticized, and pressing plasticized material into the recess.

3 Claims, 4 Drawing Sheets

FOREIGN PATENT DOCUMENTS

| | | |
|---|---|---|
| DE | 4009813 | 1/1991 |
| DE | 689 09 097 | 1/1994 |
| DE | 19506159 | 8/1995 |
| DE | 19746477 | 4/1999 |
| DE | 19927101 | 12/2000 |
| DE | 19946349 | 3/2001 |
| DE | 10338588 | 3/2005 |
| DE | 102004038084 A1 * | 3/2006 |
| EP | 65220 | 11/1982 |
| EP | 215449 | 3/1987 |
| EP | 351715 | 1/1990 |
| FR | 2071122 | 9/1971 |
| GB | 2287214 | 9/1995 |
| WO | WO-0059990 | 10/2000 |
| WO | WO-0198052 | 12/2001 |

* cited by examiner

METHOD AND DEVICE FOR CONNECTING A PLASTIC WORKPIECE TO A FURTHER WORKPIECE

CROSS-REFERENCE TO RELATED APPLICATION

The present application claims the benefit of priority of German Patent Application No. 10 2005 057 891.8 filed on Dec. 2, 2005. The entire text of the priority application is incorporated herein by reference in its entirety.

FIELD OF THE INVENTION

The present invention relates to a method of connecting a plastic workpiece to a further workpiece and to a device for carrying out the method.

BACKGROUND AND PRIOR ART

In the automobile, shipbuilding and construction industries, "multi-material structures" which comprise plastics on the one hand and metals on the other hand are being used more and more frequently, the two material constituents being frictionally connected to one another. In this way, the properties of both materials are combined in order thus to obtain a composite material having improved properties. In order to connect the plastics and the metals to one another, first of all mechanical connections and adhesive connections may be used.

Suitable mechanical connections are in particular riveted or clinch connections, which, however, have the following disadvantages. Firstly, high stress concentrations occur in the workpieces. Secondly, subsequent slackening of the connection may occur as a result of creep, moisture and relaxation. Finally, a disadvantage with mechanical connections is the fact that their external appearance rules out use in the visible region or it is necessary for these regions to be subsequently processed.

Adhesive connections have the disadvantage that the strength of the connection can be estimated only with difficulty. Furthermore, the problem arises that the cycle times for producing an adhesive connection are comparatively long due to the curing time of an adhesive. In addition, solvents may be released during the curing, meaning that monitoring of emissions may become necessary when producing the adhesive connection. In addition, if increased temperatures are required for the curing, the workpieces may also be affected. Finally, for a reliable adhesive connection, it may be necessary to pretreat the surfaces to be connected, which means an additional outlay.

In addition to the mechanical connections and the adhesive connections, welding processes are also known in order to produce multi-material structures. The welding processes applied for this purpose comprise ultrasonic welding, resistance welding, vibration welding, induction welding and infrared welding. In this case, however, the following main disadvantages become evident. Firstly surface pretreatment is necessary here, too, and secondly the energy consumption for producing such a welded connection is relatively high on account of the comparatively low efficiency. In addition, the connections produced in this way have only low reliability, meaning that they cannot be used in sensitive regions.

In the meantime, "hybrid joining techniques" have been developed in which it is attempted to improve the connection properties by the combination of two or more conventional joining methods. To this end, DE 101 49 633 A1 discloses metal-collar joining, a hole first of all being punched in the metal part, so that the hole is subsequently surrounded by a circular metal "collar". This collar is then pressed into the plastic part to be connected to the metal part, so that there is then a positive-locking connection. During this pressing-in, however, hairline cracks may occur in the plastic part, and these hairline cracks in turn may lead to the failure of the connection under load.

In another hybrid method, a metal and a plastic are connected to one another in such a way that the plastic is injected into cavities in the course of an injection moulding process, the cavities having been formed in the metal parts beforehand, so that a positive-locking connection is produced between plastic on the one hand and metal on the other hand. Due to the complicated preliminary processing of the metal parts, however, such a method is very time-consuming and requires long cycle times.

SUMMARY

Based on the prior art, the object of the present invention is therefore to provide a method and a device with which a positive-locking connection between a plastic workpiece and a further workpiece can be produced in a short time and without considerable outlay in terms of apparatus.

In a first aspect, this object is achieved by a method comprising the following steps:

providing a plastic workpiece and a further workpiece, placing the further workpiece against the plastic workpiece, providing a connecting element on a surface of the plastic workpiece, this surface being opposite the surface against which the further workpiece bears, producing a recess in the further workpiece, this recess being provided on the surface bearing against the plastic workpiece, heating the connecting element, so that the material of the connecting element is plasticized, and pressing plasticized material into the recess.

In the method according to the invention, a further workpiece, which in a preferred embodiment of the method may be a metal workpiece, is placed against a plastic workpiece. In this case, a connecting element is provided, the connecting element being arranged on a surface of the plastic workpiece, this surface being opposite the surface against which the further workpiece bears. The connecting element is preferably of cylindrical design.

In a preferred manner, the connecting element is already formed on the plastic workpiece, said connecting element furthermore preferably being formed in one piece with the plastic workpiece, so that the connecting element is provided together with the plastic workpiece. Here, in a first alternative, the plastic workpiece can already be given the required shape in the course of an injection moulding process. In a second alternative, it is possible for the connecting element to be formed by milling out in the desired manner. In both cases it is ensured that the material of the plastic workpiece is homogeneous even after the connection has been produced and has no inclusions of a foreign material, in particular in the region of the connection.

As an alternative to this, it is also possible for the connecting element to be supplied as a part separate from the plastic workpiece, so that no special processing of the plastic workpiece is required in order to adapt the latter to the method according to the invention.

Furthermore, a recess is incorporated in the further workpiece, this recess preferably being a simple bore. After that, the connecting element is heated to such an extent that it is plastically deformable, so that the plasticized material can be pressed into the recess formed in the further workpiece.

In this way, firstly a positive-locking connection is formed between the plastic workpiece on the one hand and the further workpiece on the other hand. Secondly the surface of the plastic workpiece does not have any projections, but rather is level, after the material of the connecting element has been pressed in.

Since the forming of the plastic workpiece is effected at increased temperature, only low stresses occur in the region of the connection, if at all.

By means of the method according to the invention, it is possible to replace spot-like connecting configurations known from the prior art, such as riveting or adhesive/rivet combined bonding, without having to make substantial design adaptations to the workpieces. A further advantage can be seen in the fact that the method according to the invention can be easily automated, for example in conjunction with a robot.

In a preferred embodiment, a connecting element separate from the plastic workpiece may be arranged on the plastic workpiece either before or after the recess has been produced. In addition, the separate connecting element may either be made of the same material as the plastic workpiece or may differ from the latter.

In a preferred embodiment of the method, a pressure on the material which is pressed into the recess is maintained until the material has cooled and is thus cured. This ensures that temperature-induced shrinkage processes cannot lead to cavities forming in particular in the recess, a factor which could lead to the connection not being sufficiently robust.

Furthermore, it is preferred if the recess in the further workpiece is designed as a bore, which, in a further preferred manner, also extends further through the plastic workpiece. In this case, the plasticized material of the connecting element can be pressed through the bore into the recess in the further workpiece without an especially high pressure having to be applied.

In order also to achieve positive locking between the two workpieces in the extension direction of the aperture after the connection has been produced, it is furthermore preferred if the bore is formed as a threaded bore.

Furthermore, the recess may be formed as a through-bore in the further workpiece, in which case, in a further preferred manner, that region of the through-bore which adjoins that surface of the further workpiece which faces away from the plastic workpiece has an enlarged diameter relative to the rest of the through-bore. In this design of the recess, positive locking is achieved in the axial direction of the recess. This results in a high loading capacity of the connection produced according to the invention even in the direction in which the recess runs.

According to a further preferred embodiment of the method, that surface of the further workpiece which adjoins the plastic workpiece is roughened or ground. As a result, firstly the adhesion of the plastic on the surface of the further workpiece is improved. In addition, oxide layers possibly present on the surface can be broken up in order to create a clearly defined initial state with regard to the surface. In addition, other surface treatments which are normally used to increase the adhesion of surfaces of adhesive connections may be carried out. This may involve chemical etching or electron irradiation.

The above object is also achieved by a device having a drilling element, having an annular piston which surrounds the drilling element and which has a piston surface, and having a heating ring which surrounds the piston and which has an annular locating surface, the heating ring being heatable, the piston being displaceable in the axial direction of the drilling element between a retracted position in which the piston surface is set back behind the locating surface and an advanced position in which the piston surface runs in the plane of the locating surface, and the drilling element being displaceable in its axial direction between a first position, in which the tip of the drilling element is arranged in the plane of the piston surface when the piston is in the retracted position, and a second position, in which the tip of the drilling element projects beyond the plane of the locating surface.

When the drilling element is in its first position and the piston is in its retracted position, the device according to the invention can be put onto a plastic workpiece, having a connecting element arranged thereon, in such a way that the latter is located in the depression which is enclosed by the heating ring.

After that, the drilling element, which can be rotated in a preferred manner, can be lowered into the plastic workpiece and the further workpiece, so that the requisite recess is formed in the further workpiece. The drilling element is then retracted again into its first position, and the connecting element can be heated via the heating ring to such an extent that it is plastically deformable. When this is achieved, the piston is brought into its advanced position, so that the plasticized material located in the depression is pressed into the bore and thus into the recess.

The device according to the invention therefore enables the method already described to be carried out in a simple manner. Apart from that, the advantages mentioned in connection with the method already apply to the device according to the invention.

BRIEF DESCRIPTION OF THE DRAWINGS

The present invention is explained below with reference to a drawing showing only preferred exemplary embodiments. In the drawing.

DETAILED DESCRIPTION

Figure 1:
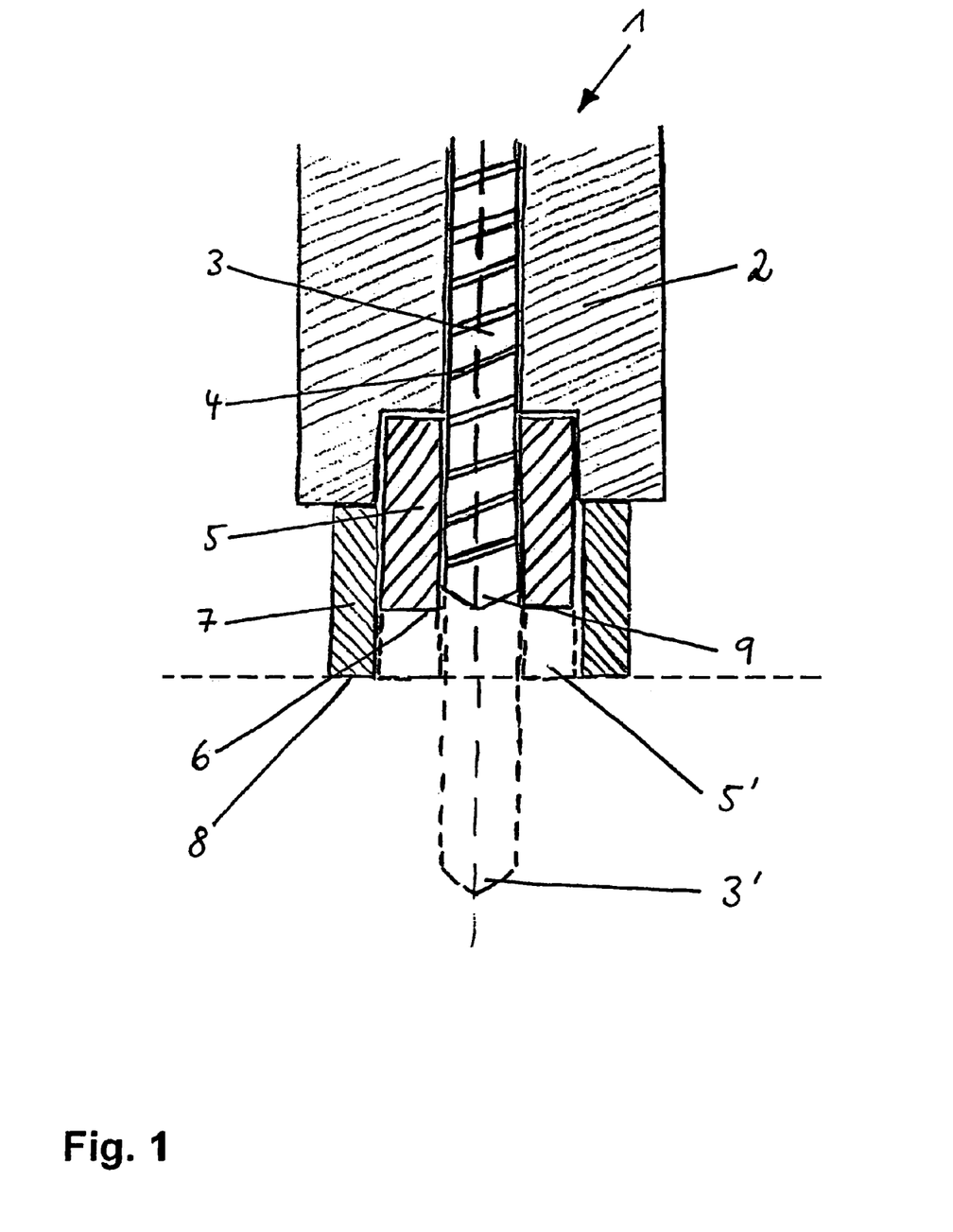
FIG. 1 shows a longitudinal section of a device according to the invention.

An exemplary embodiment of a device 1 according to the invention for producing a connection between a plastic workpiece and a further workpiece is shown in FIG. 1. The device 1 has a housing 2 of cylindrical shape. Arranged centrally in the housing 2 is a drilling element 3 which can be rotated both clockwise and anticlockwise via a drive (not shown) and which is provided with cutting ribs 4 on its circumferential surface in order to produce thread-like profiling in the bore produced by the drilling element 3.

The drilling element 3 is surrounded by an annular piston 5 which has a piston surface 6 which runs essentially perpendicularly to the longitudinal axis of the drilling element 3. Finally, the drilling element 3 and the annular piston 5 are surrounded by a heating ring 7, which can be heated and has a locating surface 8, which likewise runs essentially perpendicularly to the longitudinal axis of the drilling element 3. The piston surface 6 and the locating surface 8 thus run parallel to one another.

The cylindrical piston 5 can be displaced in the direction of the longitudinal axis of the drilling element 3 between a retracted position shown by solid lines in FIG. 1 and an advanced position 5', which is shown by broken lines in FIG. 1. In the retracted position of the piston 5, the piston surface 6 is set back behind the locating surface 8 of the heating ring 7, so that the heating ring 7 encloses a depression in which a connecting element of a plastic workpiece can be accommodated. In the advanced position 5', the piston surface 6 runs in the plane of the locating surface 8.

The drilling element 3 can likewise be displaced in the direction of its longitudinal axis between a first position and a second position 3', the second position 3' in FIG. 1 likewise being shown by broken lines. In the first position, the tip 9 of the drilling element lies in the plane of the piston surface 6 when the piston 5 is in its retracted position. When the drilling element 3 is in the second position 3', the tip 9 projects beyond the plane of the locating surface 8 of the heating ring 7 and can thus penetrate into a workpiece stack arranged below the locating surface 8.

Figure 2:
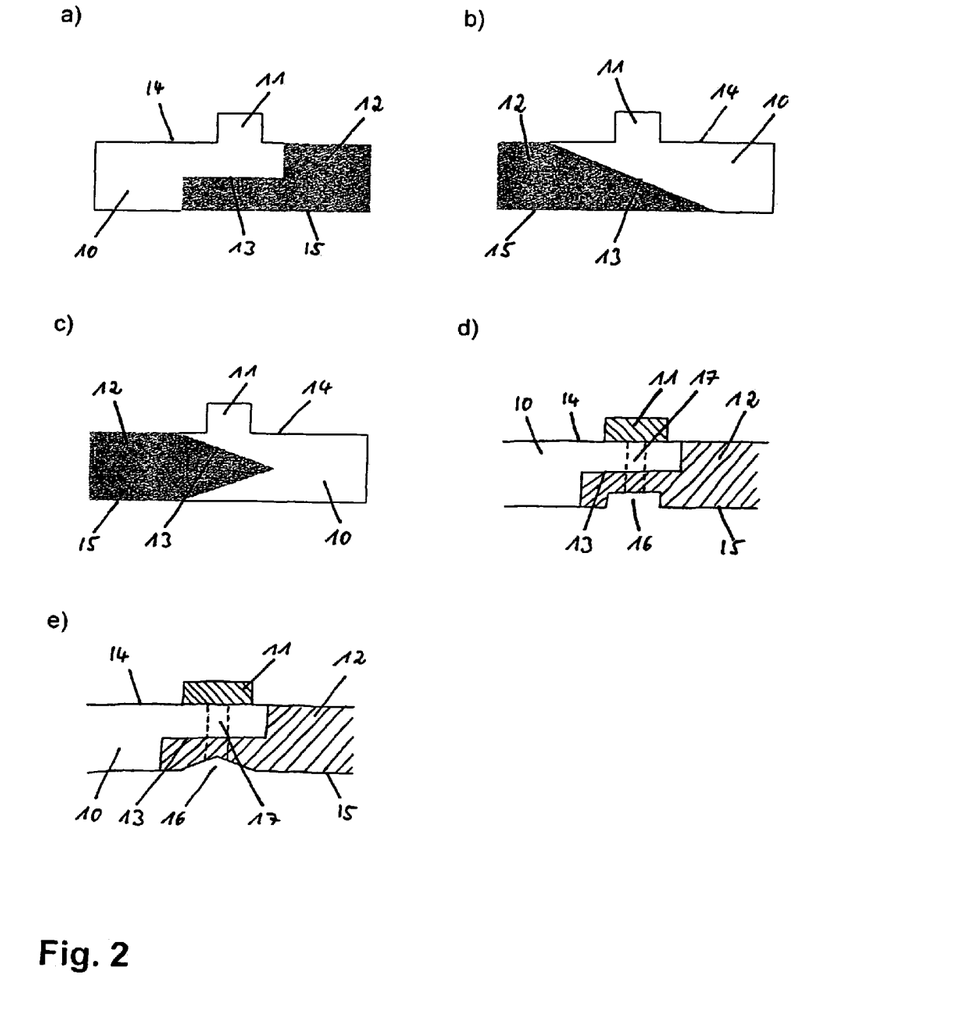
FIG. 2 shows cross-sectional views of possible connecting arrangements between a plastic workpiece and a further workpiece.

Five possible arrangements of two workpieces which can be connected by means of the method according to the invention are shown in FIG. 2. However, the invention is not limited to these examples. In the example shown in part a), a plastic workpiece 10 is provided with a connecting element 11 which is formed in one piece with the plastic workpiece 10. The plastic workpiece 10 having the connecting element 11 lies partly on a further workpiece 12, which is preferably a metal workpiece. In this case, the metal workpiece 12 bears against a surface 13 of the plastic workpiece 10 in such a way that this bearing surface 13 is opposite the surface 14 on which the connecting element 11 is formed, the bearing surface 13 and the surface 14 provided with the connecting element 11 running parallel to one another in this preferred example.

In the example of a connecting arrangement shown in part b), the bearing surface 13 at which the metal workpiece 12 bears against the plastic workpiece 10 is formed so as to be inclined relative to the surface 14 on which the connecting element 11 is formed. Nonetheless, the bearing surface 13 is opposite the surface 14 of the plastic workpiece 10. This connecting arrangement is referred to as a scarf joint.

In the example of a connecting arrangement shown in part c), the bearing surface 13 at which the metal workpiece 12 bears against the plastic workpiece 10 is also arranged in such a way that it is opposite the surface 14 having the connecting element 11, it being possible in this example for a "double scarf joint" to be produced, which in addition to a good friction grip in the plane of the surface 14 also delivers a reliable connection perpendicularly thereto.

In the exemplary embodiment shown in part d), the connecting element 11 is not formed in one piece with the plastic workpiece 10 but is arranged on the latter as a separate part. The connecting element 11 can therefore be supplied separately and the plastic workpiece 10 need not be specifically adapted to the method according to the invention. Furthermore, an indentation 16 is provided on that surface 15 of the metal workpiece 12 which faces away from the plastic workpiece 10, so that a recess 17 (shown by broken lines) subsequently embodied as a through-bore, in the region which adjoins the surface 15 which faces away from the plastic workpiece 10, has an enlarged diameter relative to the rest of the through-bore.

The exemplary embodiment shown in part e) differs from that from part d) in that the indentation 16 is not cylindrical but conical. But in this case, too, the diameter of the through-bore in the region which adjoins the surface 15 which faces away from the plastic workpiece 10 is enlarged relative to the rest of the through-bore.

In the exemplary embodiments shown in parts d) and e), the region having the enlarged diameter, which therefore forms an undercut, achieves the effect that positive locking which can be subjected to high loading is obtained in the axial direction of the through-bore.

Figure 3:
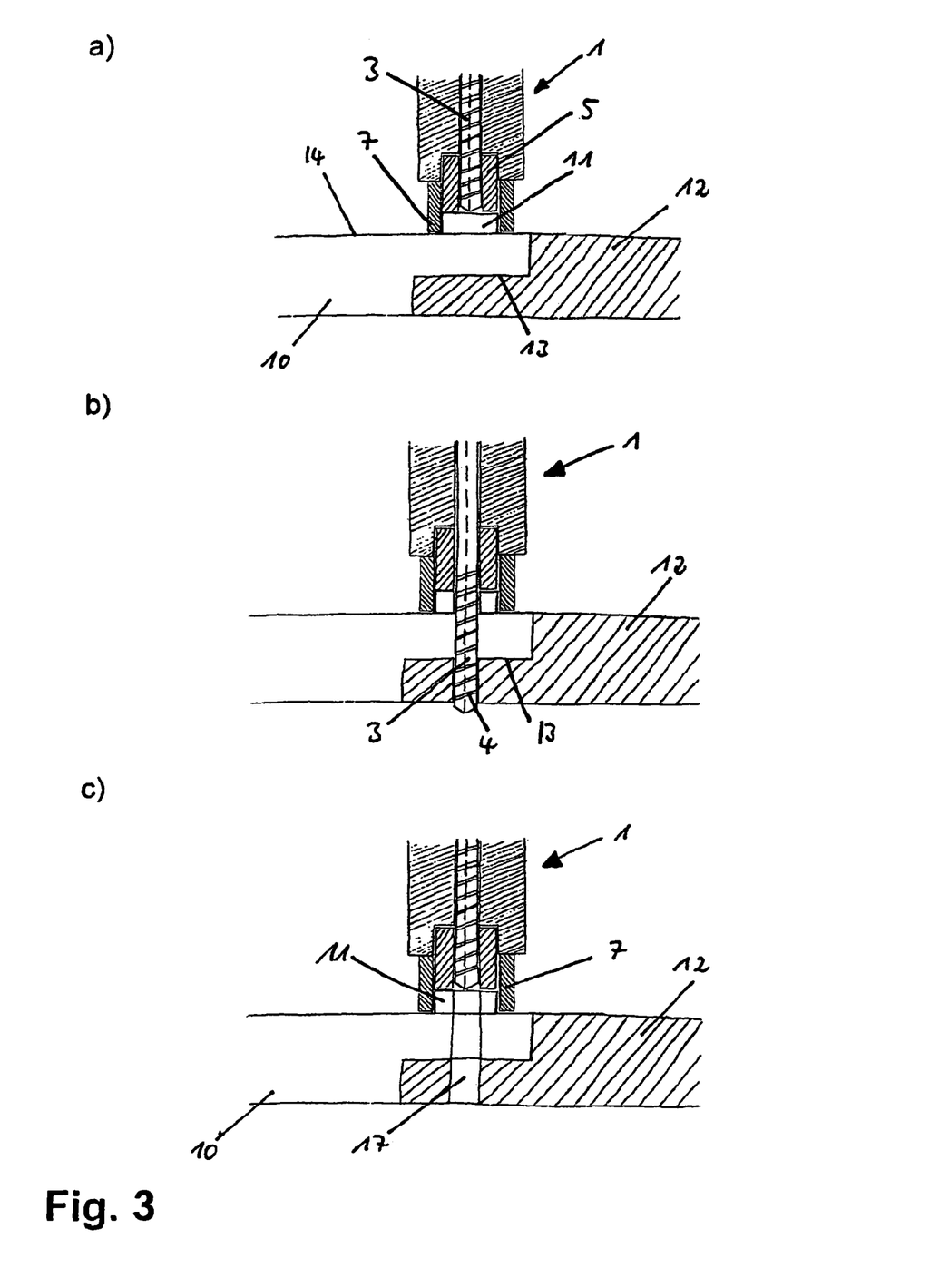
FIG. 3 shows the steps a) to c) of a preferred embodiment of the method according to the invention.
Figure 4:
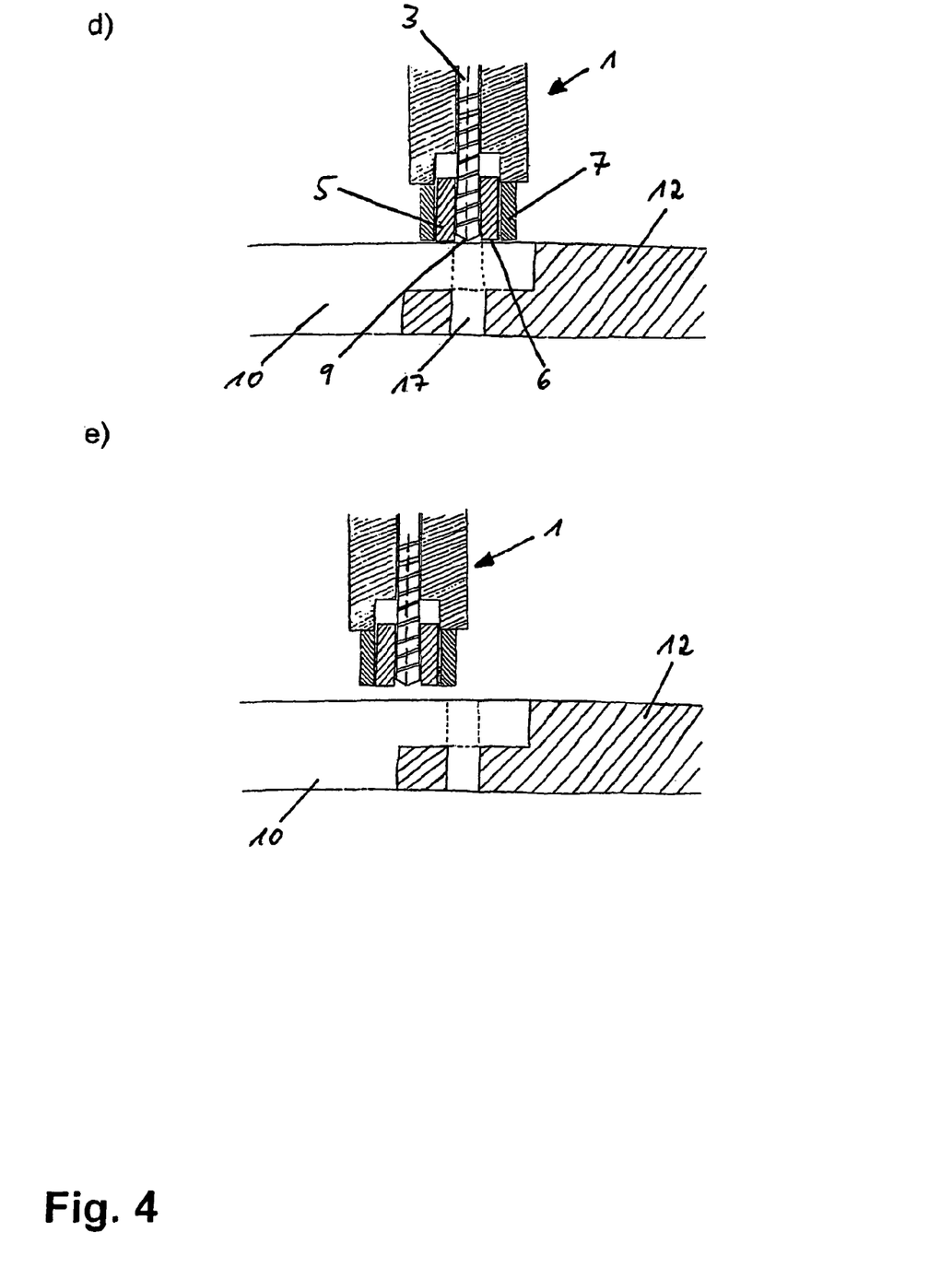
FIG. 4 shows the steps d) and e) of the preferred embodiment of the method.

The steps a) to e) of an embodiment of the method according to the invention are shown in FIG. 3 and FIG. 4, a plastic workpiece 10 having a connecting element 11 formed in one piece being connected to a further metal workpiece 12. In this case, the construction of the connection is selected as shown in detail in part a) of FIG. 2. In this embodiment, the connecting element 11 is formed in one piece with the plastic workpiece 10. However, it is also possible for the connecting element 11 to be provided as a separate element and for it to be arranged on the plastic workpiece 10.

The metal workpiece 12 is placed against the plastic workpiece 10 in such a way that the metal workpiece 12 bears against a surface 13 of the plastic workpiece 10, this surface 13 being opposite the surface 14 on which the connecting element 11 is arranged. The device 1 according to FIG. 1 is then arranged on the plastic workpiece 10 in such a way that the connecting element 11 is accommodated in the depression which is enclosed by the heating ring 7 when the piston 5 is in its retracted position and the drilling element 3 is in its first position (step a)).

After that, a recess 17 is incorporated in the metal workpiece 12, the recess 17 extending from the surface 13, at which the metal workpiece 12 bears against the plastic workpiece 10, and is formed as a through-bore through the plastic workpiece 10 and the metal workpiece 12. To incorporate the recess 17, the drilling element 3 is advanced into its second position 3', in the course of which the drilling element 3 is additionally rotated. As a result, thread-like profiling is created on the inner surfaces of the recess 17 by the cutting ribs 4 provided on the drilling element 3 (step b)).

The drilling element 3 is then retracted into its first position (see FIG. 1), in the course of which the drilling element 3 is rotated in the opposite direction to that during the advance. The heating ring 7 is then heated until the material of the connecting element 11 has become plasticized (step c)).

As soon as the material of the connecting element 11 is in a plasticized and thus viscous state, the plasticized material is pressed into the recess 17 of the metal workpiece 12. To this end, the piston 5 of the device 1 is displaced into its advanced position 5', in the course of which the drilling element 3 is displaced with it, so that its tip 9 remains in the plane of the piston surface 6 in the process (step d)).

After the plasticized material has been pressed in, the pressure on the plastic workpiece 10 by the piston 5 is maintained until the plastic material has cooled and is thus solidified. Due to the pressure being maintained in this way, shrinkage processes as a result of cooling do not lead to the possibility of cavities being formed in the recess 17.

If need be, the metal workpiece 12 may have an indentation 16 on the surface 15 facing away from the plastic workpiece 10, an undercut which achieves improved positive locking in the axial direction of the recess 17 being formed by this indentation 16 after the recess 17 has been incorporated (parts d) and e) in FIG. 2).

The device 1 according to the invention can then be removed from the workpieces 10, 12, the surface of the plastic workpiece 10 being level after the connection has been formed, since the material of the connecting element 11 has now been pressed into the recess 17 formed by the drilling element 3 (step e)).

In a preferred manner, before the metal workpiece 12 is placed against the plastic workpiece 10, that surface of the metal workpiece 12 which bears against the plastic workpiece 10 can either be ground or roughened in another way in order firstly to remove an oxide layer possibly present and secondly to achieve better adhesion between the workpieces 10, 12. In addition, other surface treatments which are normally used to increase the adhesion of adhesive connecting surfaces may be carried out. This may be chemical etching or electron irradiation.

In a simple manner, without considerable outlay in terms of apparatus, the device 1 according to the invention and the method according to the invention described enable a positive-locking connection to be formed between a plastic workpiece 10 on the one hand and a further workpiece 12 on the other hand. To this end, no connecting elements such as screws or rivets are required, but rather it is sufficient for a connecting element 11 whose material is subsequently pressed into a recess 17 provided in the further workpiece 12 to be arranged on the plastic workpiece 10. Since the material is pressed into the recess 17 in the plasticized state, only low stresses are produced in the material of the plastic workpiece 10. The connection created in this way therefore has high reliability. In addition, the method according to the invention can be easily automated, for example by attaching the device 1 to a robot.

What is claimed is:

1. Apparatus for connecting a plastic workpiece (10) to a further workpiece (12) comprising:
   a drilling element (3),
   an annular piston (5) which surrounds the drilling element (3) and which has a piston surface (6), and
   a heating ring (7) which surrounds the piston and which has an annular locating surface (8),
   the heating ring (7) being heatable,
   the piston (5) being displaceable in the axial direction of the drilling element (3) between a retracted position in which the piston surface (6) is set back behind the locating surface (8) and an advanced position in which the piston surface (6) runs in the plane of the locating surface (8), and
   the drilling element (3) being displaceable in its axial direction between a first position, in which the tip (9) of the drilling element (3) is arranged in the plane of the piston surface (6) when the piston (5) is in the retracted position, and a second position, in which the tip (9) of the drilling element projects beyond the plane of the locating surface (8).

2. Apparatus according to claim 1, wherein the drilling element (3) is rotatable in two directions of rotation.

3. Apparatus according to claim 2, wherein the drilling element (3) is designed to produce thread-like profiling in a bore produced by it.

\* \* \* \* \*

UNITED STATES PATENT AND TRADEMARK OFFICE
CERTIFICATE OF CORRECTION

PATENT NO. : 7,780,432 B2  
APPLICATION NO. : 11/607159  
DATED : August 24, 2010  
INVENTOR(S) : Sergio De Traglia Amancio Filho et al.

Page 1 of 1

It is certified that error appears in the above-identified patent and that said Letters Patent is hereby corrected as shown below:

On the Title Page:

At Item (30), "10 2005 057 891" should be -- 10 2005 057 891.8 --.

Signed and Sealed this  
Third Day of May, 2011

David J. Kappos  
*Director of the United States Patent and Trademark Office*